F. VAN DOREN.
Hand Seeder.
No. 27,172.
Patented Feb. 14, 1860.
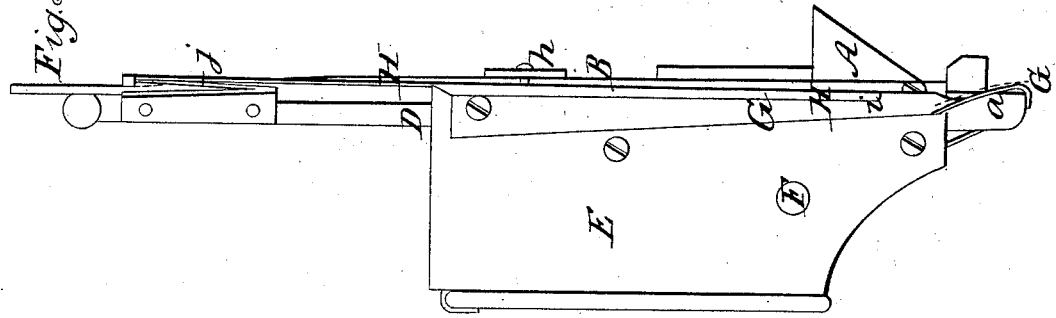
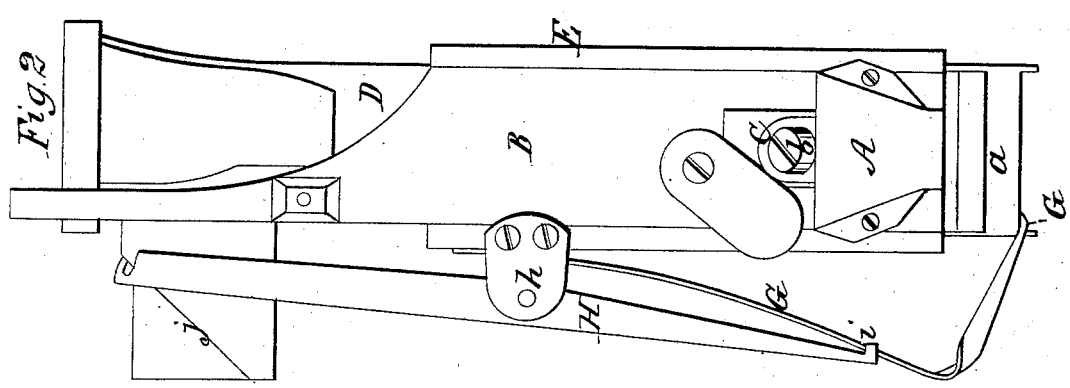
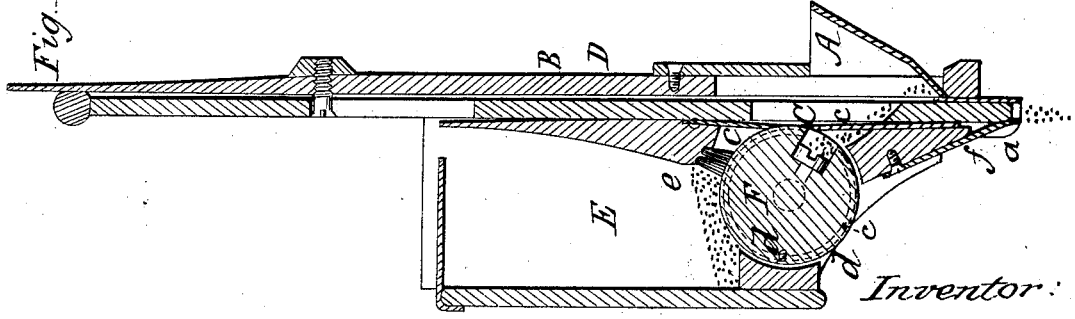
Witnesses:
James Berry
A. N. Foote
Inventor:
Francis Van Doren
by Munn & Co.
Attys

UNITED STATES PATENT OFFICE.

FRANCIS VAN DOREN, OF ADRIAN, MICHIGAN.

IMPROVEMENT IN HAND SEED-PLANTERS.

Specification forming part of Letters Patent No. 27,172, dated February 14, 1860.

*To all whom it may concern:*

Be it known that I, FRANCIS VAN DOREN, of Adrian, in the county of Lenawee and State of Michigan, have invented a new and useful Improvement in Hand Seed-Planters; and I do hereby declare that the following is a full, clear, and exact description of the same, reference being had to the accompanying drawings, forming a part of this specification, in which—

Figure 1 is a vertical central section of a planter constructed after my invention. Fig. 2 is a front view of the same, and Fig. 3 is a side view of the same.

Similar letters of reference in each of the several figures indicate corresponding parts.

The nature of my invention consists, first, in the arrangement of a secondary hopper at the front side and near the bottom of the planter for the seed, which is brought from the main hopper by a roller connected to the plunger, to fall into, and thus be in sight of the operator until it is forced into the ground. This is an important feature, for it enables the operator to know whenever the plunger fails to bring down seed from the main hopper.

It consists, second, in an arrangement for operating the device which scrapes the dirt off of the discharge end of the planter, as hereinafter described.

To enable others skilled in the art to make and use my invention, I will proceed to describe its construction and operation.

A is an auxiliary hopper, arranged on the front side of an ordinary hand seed-planter, B, so that if seed falls into it the operator can see the same, and if seed does not run into it he is thereby made aware of the fact that the machine has become clogged. C is a passage in the plunger D leading into said hopper. The hopper A communicates with the spring-discharge chamber *a* at the lower end of the planter when the plunger is raised, but has no communication with the same when the plunger is down.

The seed is supplied from the main hopper E by means of a roller, F, which has an adjustable cell, *b*, formed in its circumference, and is connected to the plunger D by a belt, *c*, said belt being carried once around the roller and fastened to the same, as shown at *d*, and then attached to the plunger by its ends, as shown at *e f*.

The arrangement thus far described serves for planting the seed, and the operation of the same is as follows: The plunger being raised to its full height, the end of the planter is placed upon the ground and the plunger lowered to the position shown in Fig. 1. This action causes the feed-roller to take seed from the main hopper and empty it into the auxiliary hopper, as shown in red. The plunger is now raised, and simultaneously therewith the seed in the auxiliary hopper empties into the spring-discharge chamber of the planter. Now, by lowering the plunger seed will be taken from the main hopper by the roller and emptied into the auxiliary hopper, and simultaneously therewith the seed which is in the spring-discharge chamber is forced into the ground, as illustrated in Fig. 1.

In order to clear the adhering soil from the spring-discharge end of the planter, I arrange an angular spring-scraper, G, on the planter. This scraper is attached to the side of the planter, and extends inclimingly down to near the bottom of the same, and has its lower end bent so as to lie across the fixed and spring jaws of the discharge end of the planter, as represented.

H is a rocking lever, pivoted at the center of its length to a bracket, *h*, of the planter. This lever is loosely connected by a guide, *i*, to the spring-scraper and to an inclined plate, *j*, of the plunger, as shown in the drawings.

From this description it will be evident that if the plunger is raised from the position shown in Fig. 1 the inclined plate *j* will rise with it, and consequently the upper end of the lever H will be forced outward and the lower end of the same forced inward. By thus forcing the lower end inward the spring-scraper is caused to pass from one side of the spring-discharge to the other, and in its progress scrape off the soil which may be adhering to the bottom of the spring-discharge. When the plunger is lowered the elasticity which the scraper itself possesses will cause it to resume its former position, as shown in Fig. 2.

What I claim as my invention, and desire to secure by Letters Patent, is—

1. The arrangement of a secondary hopper, A, at the front side and near the bottom of the planter for the seed, which is brought from the main hopper by a roller connected to the plunger, to fall into and thus be in sight of the operator until it is forced in the ground, substantially as and for the purposes set forth.

2. The arrangement H $i j$, for operating the device G, which scrapes the dirt off of the discharge end of the planter, substantially as and for the purposes set forth.

FRANCIS VAN DOREN.

Witnesses:
 THOMAS OLDEN,
 C. W. BEERS.